United States Patent
Ahmed et al.

(10) Patent No.: US 11,270,533 B2
(45) Date of Patent: Mar. 8, 2022

(54) ULTRA-HIGH FREQUENCY LOW ENERGY BASED PHONE AS A KEY ACCESS TO A VEHICLE USING TWO-WAY COMMUNICATION FOR MULTIPATH MITIGATION

(71) Applicants: DENSO International America, Inc., Southfield, MI (US); DENSO CORPORATION, Kariya (JP)

(72) Inventors: Osman Ahmed, Bloomfield Hills, MI (US); Raymond Michael Stitt, Ada, MI (US); Kyle Golsch, Pontiac, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/801,401

(22) Filed: Feb. 26, 2020

(65) Prior Publication Data

US 2021/0264703 A1    Aug. 26, 2021

(51) Int. Cl.
*H04B 17/318* (2015.01)
*G07C 9/00* (2020.01)
(Continued)

(52) U.S. Cl.
CPC ............ *G07C 9/00309* (2013.01); *G01S 3/50* (2013.01); *H04B 17/318* (2015.01); *H04W 4/40* (2018.02); *H04W 4/80* (2018.02)

(58) Field of Classification Search
CPC ... G07C 9/00309; H04B 17/318; H04W 4/80; H04W 4/40; H04W 64/00; G01S 3/50;
(Continued)

(56) References Cited

U.S. PATENT DOCUMENTS 9,688,247 B1    6/2017   Jayaraman et al.
9,734,714 B1 *  8/2017   Fan ......................... H04W 4/46
(Continued)

FOREIGN PATENT DOCUMENTS

BR     102014017465 A2    2/2016
CN        104574593 A     4/2015
(Continued)

*Primary Examiner* — Hai Phan
*Assistant Examiner* — Anthony D Afrifa-Kyei
(74) *Attorney, Agent, or Firm* — Harness, Dickey & Pierce, P.L.C.

(57) ABSTRACT

A system includes a transceiver and an access module. The transceiver is implemented at a vehicle: receives a first RF signal from a portable access device via multiple antennas; transmits a second RF signal from the vehicle to the portable access device; and receives a third RF signal from the portable access device. The third RF signal indicates an AOD of the first RF signal or a second AOA of the second RF signal as received at the portable access device. The access module: estimates a first AOA of the first RF signal; determines a resultant AOA based on the first AOA and the AOD or the second AOA; determines a location of the portable access device relative to the vehicle based on the resultant AOA; and permits access to the vehicle or control of a portion of the vehicle based on the location of the portable access device.

22 Claims, 10 Drawing Sheets

(51) Int. Cl.
*H04W 4/80* (2018.01)
*H04W 4/40* (2018.01)
*G01S 3/50* (2006.01)

(58) Field of Classification Search
CPC ... G01S 3/46; G01S 3/14; G01S 19/01; G01S 5/0263; G01S 5/10
See application file for complete search history.

(56) References Cited

U.S. PATENT DOCUMENTS

| | | | |
|---|---|---|---|
| 9,794,753 B1 | 10/2017 | Stitt et al. | |
| 9,894,492 B1 | 2/2018 | Elangovan et al. | |
| 9,989,633 B1* | 6/2018 | Pandey | G01S 13/42 |
| 10,002,479 B2 | 6/2018 | Oz et al. | |
| 10,244,476 B2 | 3/2019 | Elangovan et al. | |
| 10,328,898 B2 | 6/2019 | Golsch et al. | |
| 10,328,899 B2 | 6/2019 | Golsch | |
| 10,328,900 B1 | 6/2019 | Yakovenko et al. | |
| 2011/0215921 A1 | 9/2011 | Ben Ayed et al. | |
| 2012/0045058 A1 | 2/2012 | Weghaus | |
| 2014/0274013 A1 | 9/2014 | Santavicca | |
| 2015/0148989 A1* | 5/2015 | Cooper | H04W 4/023 701/2 |
| 2015/0161832 A1 | 6/2015 | Esselink et al. | |
| 2015/0310681 A1 | 10/2015 | Avery et al. | |
| 2015/0356797 A1 | 12/2015 | McBride et al. | |
| 2016/0150407 A1 | 5/2016 | Michaud et al. | |
| 2016/0370450 A1* | 12/2016 | Thorn | G01S 3/46 |
| 2017/0062938 A1 | 3/2017 | Cheng et al. | |
| 2017/0104589 A1 | 4/2017 | Lambert et al. | |
| 2017/0132533 A1 | 5/2017 | Darnell et al. | |
| 2017/0309098 A1 | 10/2017 | Watters et al. | |
| 2017/0330402 A1 | 11/2017 | Menard et al. | |
| 2018/0029560 A1 | 2/2018 | Mohaupt et al. | |
| 2018/0099643 A1 | 4/2018 | Golsch et al. | |
| 2018/0103414 A1 | 4/2018 | Golsch | |
| 2018/0126952 A1 | 5/2018 | Niemiec | |
| 2018/0154865 A1 | 6/2018 | Bianchi, III et al. | |
| 2018/0269565 A1 | 9/2018 | Guthrie et al. | |
| 2021/0026347 A1* | 1/2021 | Nakashima | H04B 1/3827 |
| 2021/0185483 A1* | 6/2021 | Vernon | B60R 16/02 |

FOREIGN PATENT DOCUMENTS

| | | |
|---|---|---|
| WO | WO-16156682 A1 | 10/2016 |
| WO | WO-2017181050 A1 | 10/2017 |
| WO | WO-18040641 A1 | 3/2018 |

* cited by examiner

ULTRA-HIGH FREQUENCY LOW ENERGY BASED PHONE AS A KEY ACCESS TO A VEHICLE USING TWO-WAY COMMUNICATION FOR MULTIPATH MITIGATION

FIELD

The present disclosure relates to passive vehicle access systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional passive entry/passive start (PEPS) systems allow keyless entry including providing a user access to various vehicle functions if the user possesses a key fob that has been paired with an in-vehicle PEPS electronic control unit (or PEPS module). As an example, the user in possession of the key fob may approach a vehicle having the PEPS module. The key fob communicates with the PEPS module and if the key fob is authenticated, the PEPS module may unlock doors of the vehicle. The PEPS module (i) performs an authentication process to determine if the key fob is authorized to access the vehicle, and (ii) determines a location of the key fob relative to the vehicle. The authentication process may include the exchange of an encrypted password or signature. If the password or signature is correct, then the key fob is determined to be authorized. Location of the key fob may be determined based on, for example, strength of a signal received from the key fob. If the key fob is authenticated and is located within an authorized zone of the vehicle, then access to the interior of the vehicle is permitted without use of a traditional key.

As another example, the user in possession of the key fob may activate a vehicle function by pushing a button on the key fob. In response to pushing the button, the key fob communicates with the PEPS module and if the key fob is authenticated and within a predetermined distance of the vehicle, the PEPS module performs the stated function (e.g., starts the vehicle, opens a door, sets off an alarm, etc.) associated with the button pressed on the key fob. The communication performed for the two examples may include the key fob and the PEPS module performing a one-way low-frequency (LF) wake-up function and a one-way or two-way radio frequency (RF) authentication function.

A phone as a key (PAK) vehicle access system can operate similarly as the stated PEPs system, except the vehicle is accessed using a mobile phone rather than a key fob. As an example, the mobile phone can communicate with a PAK module or a telematics control unit (TCU) in the vehicle to begin an access pairing process. The mobile phone and either the PAK module or the TCU perform the access pairing process to establish a trust relationship. The pairing process can include Bluetooth® pairing whereby: security information is exchanged between the mobile phone and the vehicle directly; a mobile phone address, a mobile phone identity resolving key, a reservation identifier and/or an encryption key are exchanged via a cloud-based network; and/or the mobile phone presents a certificate to the vehicle, where the certificate is signed by (i) the mobile phone, (ii) a trusted security signing authority such as a manufacturer of the vehicle, and/or (iii) a trusted third party. In the case of a certificate, the certificate can include an identifier of a person authorized to access a vehicle, an identifier of a cloud-based network authorized to transfer the certificate, an identifier of a rental or lease agreement of the vehicle, an identifier of the vehicle, a date and time period during which the vehicle is permitted for use by the authorized person, and/or other restrictions and/or access/license information.

For passive entry, some user action is typically needed to initiate a process of waking up a key fob or mobile phone (referred to as portable access devices). For example, this may include a user approaching the vehicle with a portable access device and/or touching and/or pulling on a door handle. When a PEPS module or a PAK module, which are referred to as access modules, detects this behavior, the access module performs a localization process to begin searching for and waking up the key fob.

A controller of the key fob measures a LF signal level during communication with the access module. The controller determines a received signal strength indicator (RSSI) and provides the RSSI to the access module. The access module then determines a location of the key fob based on the RSSI.

A smartphone, a wearable device, and/or other smart portable network device may perform as a key fob. The smart portable network devices may enable various vehicle functions and long range distancing features, such as passive welcome lighting, distance bounding on remote parking applications, etc.

SUMMARY

A system is provided and includes a first transceiver and an access module. The first transceiver is implemented at a vehicle and configured to (i) receive a first radio frequency signal from a portable access device via multiple antennas, (ii) transmit a second radio frequency signal from the vehicle to the portable access device, and (iii) receive a third radio frequency signal from the portable access device. The third radio frequency signal indicates at least one of (i) an angle of departure of the first radio frequency signal, or (ii) a second angle of arrival of the second radio frequency signal as received at the portable access device. The access module is configured to: estimate a first angle of arrival of the first radio frequency signal; determine a resultant angle of arrival based on the first angle of arrival and at least one of (i) the angle of departure, or (ii) the second angle of arrival; determine a first location of the portable access device relative to the vehicle based on the resultant angle of arrival; and permit at least one of access to the vehicle or control of a portion of the vehicle based on the first location of the portable access device.

In other features, the first radio frequency signal and the second radio frequency signal are at an ultra-high frequency low energy frequency.

In other features, the first radio frequency signal and the second radio frequency signal are at 2.4 GHz.

In other features, the access module is configured to: weight the first angle of arrival; weight at least one of (i) the angle of departure, or (ii) the second angle of arrival; and determine the resultant angle of arrival based on the weighted first angle of arrival and the weighted at least one of (i) the angle of departure, or (ii) the second angle of arrival.

In other features, the access module is configured to: at least one of determine or obtain a first received signal strength indicator associated with the first radio frequency signal and a second received signal strength indicator associated with the second radio frequency signal; and based on the first received signal strength indicator and the second received signal strength indicator, determine the resultant angle of arrival.

In other features, the transceiver is configured to (i) receive a first radio frequency signals from the portable access device via the antennas, (ii) transmit a second radio frequency signals from the vehicle to the portable access device via one or more of the antennas, and (iii) receive the third radio frequency signal from the portable access device. The third radio frequency signal indicates at least one of (i) angles of departure of the first radio frequency signals, or (ii) second angles of arrival of the second radio frequency signals as received at the portable access device. The first radio signals include the first radio frequency signal. The second radio frequency signals include the second radio frequency signal. The access module is configured to: estimate first angles of arrival of the first radio frequency signals; and determine the resultant angle of arrival based on the first angles of arrival and at least one of (i) the angles of departure, or (ii) the second angles of arrival.

In other features, the access module is configured to: determine differences between the first angles of arrival and the at least one of (i) the angles of departure, or (ii) the second angles of arrival; drop the differences that are greater than or equal to a predetermined value; and determine the resultant angle of arrival based on the first angles of arrival and the at least one of (i) the angles of departure, or (ii) the second angles of arrival, which have corresponding differences that are less than the predetermined value.

In other features, the access module is configured to: determine differences between the first angles of arrival and the at least one of (i) the angles of departure, or (ii) the second angles of arrival; weight the differences; and determine the resultant angle of arrival based on the weighted differences.

In other features, the access module is configured to: calculate at least one of an angle of arrival or an angle of departure for each of multiple radio frequencies; at least one of determine or obtain multiple signal strength indicators associated with the radio frequencies; and determine the resultant angle of arrival based on at least one of (i) the angles of arrival for the radio frequencies, (ii) the angles of departure for the radio frequencies, or (iii) the received signal strength indicators.

In other features, the access module is configured to determine a speed of the portable access device, and based on the speed, determine the location of the portable access device.

In other features, the system further includes: the portable access device; a second transceiver; and a control module implemented in the portable access device and configured to transmit the first radio frequency signal and the third radio frequency signal via the second transceiver.

In other features, the second transceiver is configured to (i) transmit first radio frequency signals from the portable access device via one or more antennas, (ii) receive second radio frequency signals from the vehicle via the one or more antennas, and (iii) transmit the third radio frequency signal from the portable access device to the vehicle, wherein the third radio frequency signal indicates at least one of (i) angles of departure of the first radio frequency signals, or (ii) second angles of arrival of the second radio frequency signals as received at the portable access device. The first radio signals include the first radio frequency signal. The second radio frequency signals include the second radio frequency signal. The control module is configured to estimate at least one of (i) the angles of departure, or (ii) the second angles of arrival.

In other features, the control module is configured to determine a location of the portable access device relative to the vehicle and report the location determined by the control module to the vehicle; and the access module is configured to determine the first location of the portable access device based on the location reported by the control module.

In other features, a method is provided and includes: receiving a first radio frequency signal from a portable access device via antennas at a first transceiver, where the first transceiver is implemented in a vehicle; transmitting a second radio frequency signal from the vehicle to the portable access device; receiving a third radio frequency signal from the portable access device at the first transceiver, where the third radio frequency signal indicates a second angle of arrival of the second radio frequency signal as received at the portable access device; estimating a first angle of arrival of the first radio frequency signal; determining a resultant angle of arrival based on the first angle of arrival and the second angle of arrival; determining a first location of the portable access device relative to the vehicle based on the resultant angle of arrival; and permitting at least one of access to the vehicle or control of a portion of the vehicle based on the first location of the portable access device.

In other features, the method further includes: weighting the first angle of arrival; weighting the second angle of arrival; and determining the resultant angle of arrival based on the weighted first angle of arrival and the weighted second angle of arrival.

In other features, the method further includes: at least one of determining or obtaining a first received signal strength indicator associated with the first radio frequency signal and a second received signal strength indicator associated with the second radio frequency signal; and based on the first received signal strength indicator and the second received signal strength indicator, determine the resultant angle of arrival.

In other features, the method further includes: receiving first radio frequency signals from the portable access device via the antennas; transmitting second radio frequency signals from the vehicle to the portable access device via one or more of the antennas; receiving the third radio frequency signal from the portable access device, where the third radio frequency signal indicates second angles of arrival of the second radio frequency signals as received at the portable access device, where the first radio signals include the first radio frequency signal, and where the second radio frequency signals include the second radio frequency signal; estimating first angles of arrival of the first radio frequency signals; and determining the resultant angle of arrival based on the first angles of arrival and the second angles of arrival.

In other features, the method further includes: determining differences between the first angles of arrival and the second angles of arrival; dropping the differences that are greater than or equal to a predetermined value; weighting remaining differences; and determining the resultant angle of arrival based on the weighted differences.

In other features, the method further includes: calculating an angle of arrival for each of multiple radio frequencies; at least one of determining or obtaining received signal strength indicators associated with the radio frequencies;

and determining the resultant angle of arrival based on the angles of arrival for the radio frequencies and the received signal strength indicators.

In other features, the method further includes: transmitting first radio frequency signals from the portable access device via one or more antennas to the vehicle; receiving second radio frequency signals from the vehicle via the one or more antennas; estimating second angles of arrival of the second radio frequency signals; and transmitting the third radio frequency signal from the portable access device to the vehicle, where the third radio frequency signal indicates the second angles of arrival of the second radio frequency signals as received at the portable access device, where the first radio signals include the first radio frequency signal, and where the second radio frequency signals include the second radio frequency signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A PAK system may include low energy sensors, ultra-wideband (UWB) sensors and/or Bluetooth® low-energy (BLE) nodes (e.g., BLE transceivers and antennas) installed throughout a vehicle. The LF sensors and/or the BLE nodes may be used to wakeup a portable access device (e.g., a keyfob, a mobile phone, a wearable device, etc.). The LF sensors, the UWB sensors and/or the BLE nodes may be used to determine the location of the mobile device relative to the vehicle.

Figure 2:
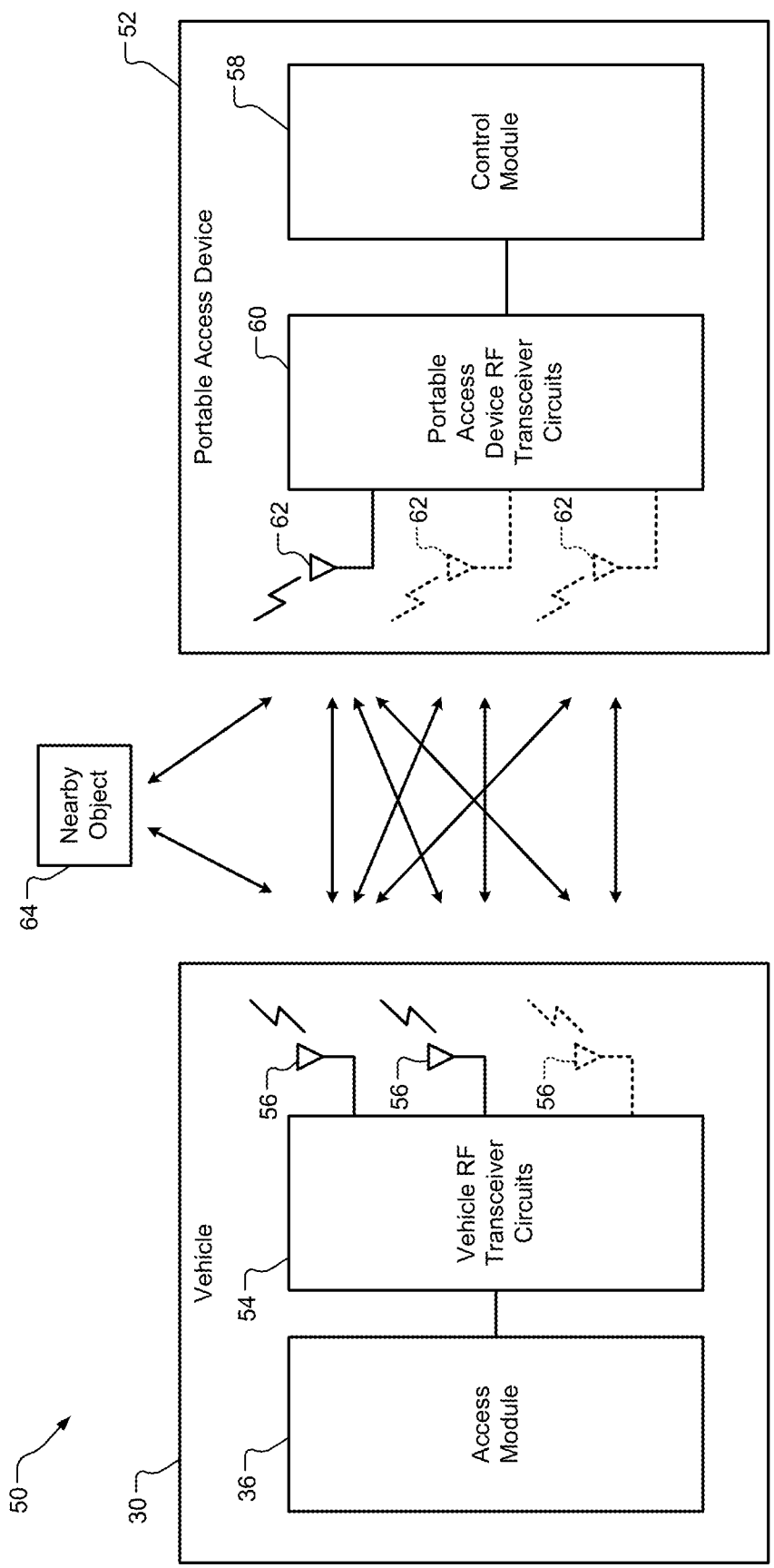
FIG. 2 is a functional block diagram of an example of a two-way access communication system in accordance with the present disclosure.

The examples set forth herein include access systems, such as PAK systems, that include mobile devices and vehicle access devices communicating with each other and determining angles of arrival of ultra-high frequency (UHF) low energy signals (e.g., Bluetooth® low energy signals) for multipath mitigation. Multipath angle of arrival (AOA) estimation errors can occur in a multipath environment. Multipath propagation is an inherent nature of a UHF low energy signal, for example, at 2.4 giga-hertz (GHz) and introduces error in AOA estimation due to surrounding objects. An example multipath environment is shown in FIG. 2. A transmitted signal may reflect off the nearby object and be detected at antennas of a receiver. The receiver may then determine the AOA of the reflected signal and not an AOA of a signal transmitted directly to the receiver. In certain environments and depending on locations of the transmitter, receiver and nearby object, the signal reflected off of the object can be consistently detected and result in an AOA estimation error. Multipath environments can constructively and/or destructively affect AOA determinations and as a result location determinations.

The examples set forth herein include transmitting UHF signals (or RF signals) between an access module of a vehicle and a portable access device and determining AOAs via both the access module of the vehicle and a control module of the portable access device. This may be done over multiple channels and using multiple vehicle antennas and one or more portable access device antennas. A resultant AOA is estimated based on the determined AOAs and location of the portable access device is determined based on the resultant AOA. This mitigates the errors associated with nearby objects. Angles of departure may also or alternatively be determined and utilized as further described below.

Figure 1:
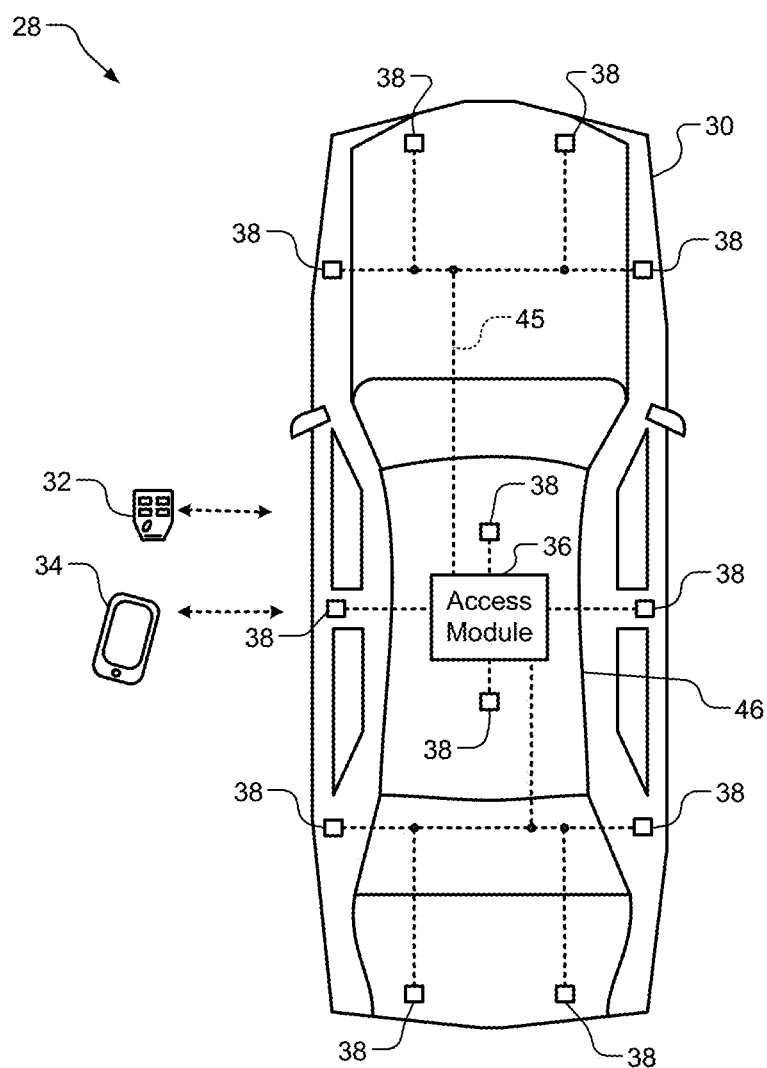
FIG. 1 is a functional block diagram of an example of a vehicle access system including an access module, antennas, and portable access devices in accordance with the present disclosure.

FIG. 1 shows a vehicle access system 28 that performs as a PEPS system and a PAK system. The vehicle access system 28 includes a vehicle 30 and may include a key fob 32, a mobile phone 34, and/or other portable access devices, such as a wearable device, a laptop computer, or other portable network device. The portable access devices may be, for example, a Bluetooth®-enabled communication device, such as a smart phone, smart watch, wearable electronic device, key fob, tablet device, or other device associated with a user of the vehicle 30. The user may be an owner, driver, or passenger of the vehicle 30 and/or a technician for the vehicle 30.

The vehicle 30 includes an access module 36 and antenna modules 38. One or more of the antenna modules 38 may be included in the access module 36. As an example, the antenna modules 38 may each be implemented as one or more antennas. The access module 36 may wirelessly transmit and receive LF, BLE and/or UWB signals via the antenna modules 38 including wirelessly communicating with the portable access devices. As an example, the UWB signals may be spread over a large bandwidth of greater than 500 Mega-Hertz (MHz). The LF, BLE and/or UWB signals may be transmitted to and/or received from the portable access devices and used to track a location and movement of the portable access devices. Although particular numbers of antenna modules 38 are shown, any number of each may be utilized. The access module 36 may communicate with some of the antenna modules 38 wirelessly and/or via a vehicle interface 45. As an example, the vehicle interface 45 may include a controller area network (CAN) bus, a local interconnect network (LIN) for lower data-rate communication, a clock extension peripheral interface (CXPI) bus and/or one or more other vehicle interfaces.

The antenna modules 38 may be at various locations on the vehicle and transmit and receive low frequency signals (e.g., 125 kHz signals), high frequency RF (e.g., BLE) signals and/or UWB signals. Each of the antenna modules 38 includes one or more LF, RF (or BLE) and/or UWB antennas and may include a control module and/or other circuitry for LF, RF (or BLE) and/or UWB signal transmission. The antenna modules 38 may transmit BLE signals according to BLE communication protocols. Alternatively, the antenna modules 38 may communicate according to other wireless communication protocols, such as wireless fidelity (Wi-Fi). In one embodiment and to improve signal coverage relative to the vehicle and improve transmission and reception characteristics, the antenna modules 38 are located in a roof 46 of the vehicle 30.

FIG. 2 shows a two-way access communication system 50 that includes the vehicle 30 and a portable access device 52 (e.g., one of the portable access devices 32, 34 of FIG. 1). The vehicle 30 includes the access module 36, vehicle RF transceiver circuits 54 and two or more antennas 56. The portable access device 52 includes a control module 58, portable access device RF transceiver circuits 60 and one or more antennas 62. UHF low energy signals (e.g., BLE signals) are transmitted between the RF transceiver circuits 54, 60 using the antennas 56, 62 and angles of arrival of the transmitted signals are determined at the vehicle 30 and at the portable access device 52. Angles of departure may also be determined at the vehicle and at the portable access device. This includes angles of arrival (AOAs) and angles of departure (AODs) of signals transmitted along direct paths between the vehicle 30 and the portable access device 52 and signals that are reflected off one or more nearby objects (e.g., the nearby object 64).

In the two-way access communication system 50, the portable access device 52 may be used as a key for vehicle passive functions. When the portable access device 52 is within a predetermined range of the vehicle 30, the portable access device 52 may be granted access for one or more requested functions. As an example, when the portable access device 52 is granted access, the control module 58 may transmit a command signal to the access module 36 and/or other module of the vehicle 30 instructing the module to automatically park the vehicle 30. Other functions may be performed, such as locking or unlocking doors and/or windows, opening doors or windows, tuning on and/or setting parameters of a heating ventilation and air-conditioning (HVAC) system, turning on or off lights and/or an engine, etc. Determination of whether the portable access device 52 is within the predetermined range of the vehicle 30 may be based on the location of the portable access device 52, as described herein.

Figure 3A:
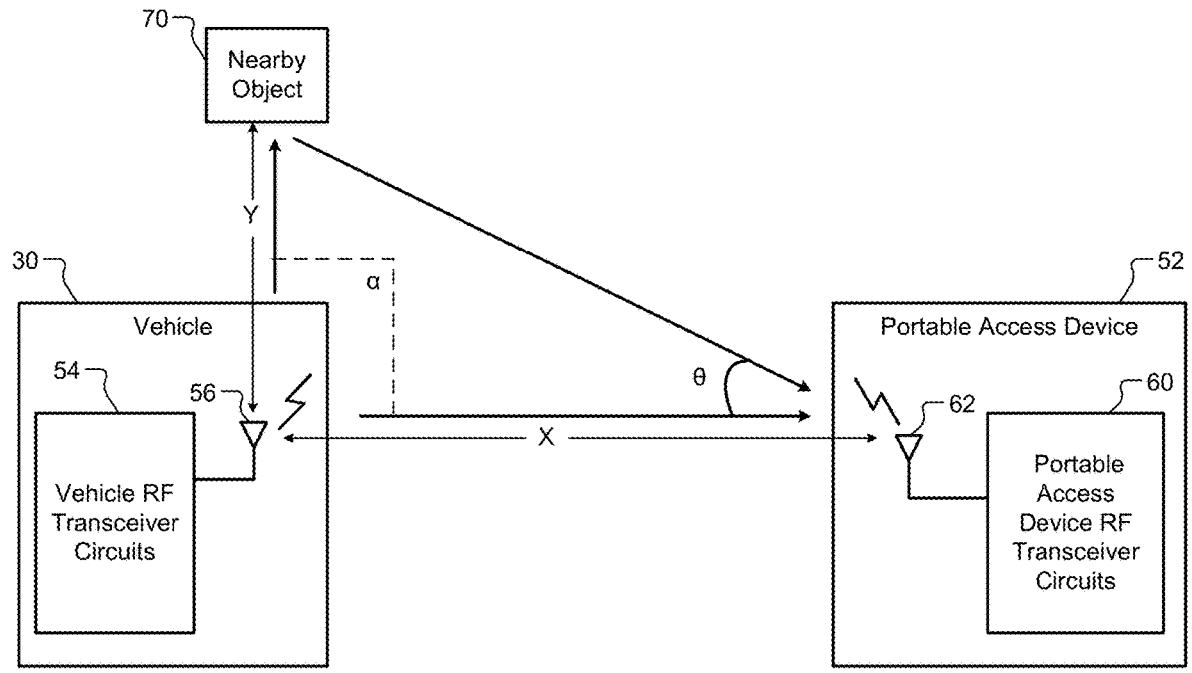
FIG. 3A illustrates angles of arrival and departure in a multipath environment when signals are transmitted from a vehicle to a portable access device.
Figure 3B:
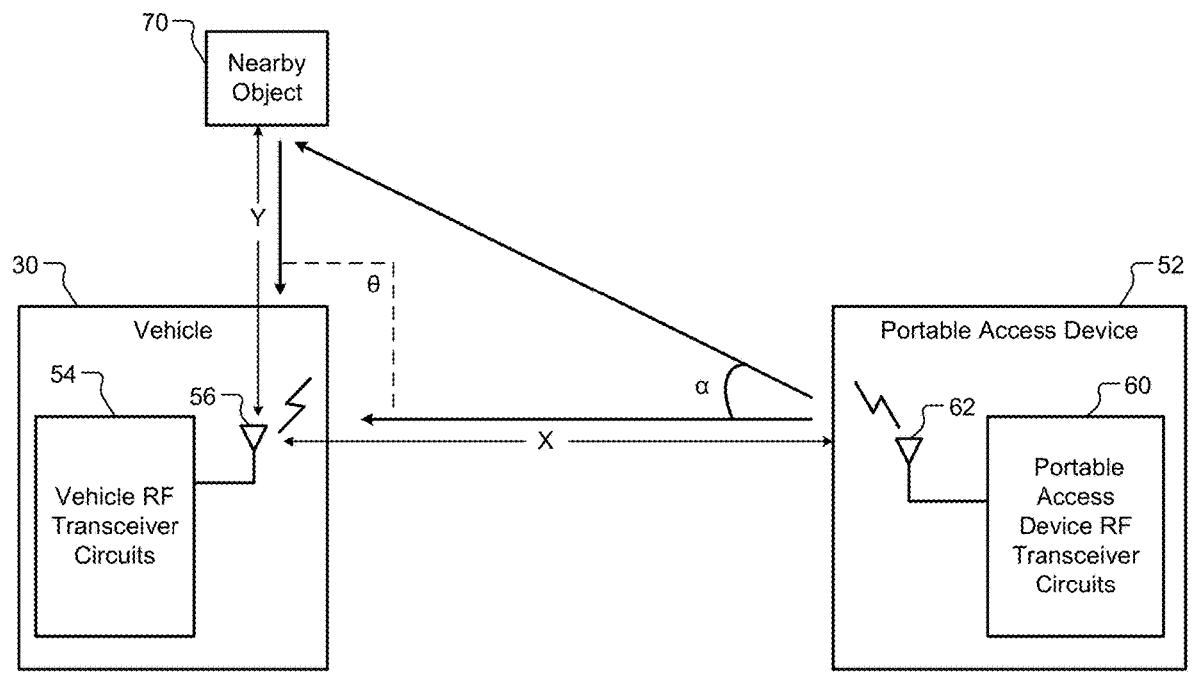
FIG. 3B illustrates angles of arrival and departure in a multipath environment when signals are transmitted from a portable access device to a vehicle.

FIG. 3A illustrates angles of arrival and departure in a multipath environment when signals are transmitted from the vehicle 30 to the portable access device 52. In FIG. 3A the vehicle RF transceiver circuits 54 (or one thereof) transmits a RF signal from the vehicle 30 to the portable access device 52 via the antenna 56. The RF signal may follow a direct path to the portable access device 52 and/or follow an indirect path and be reflected off a nearby object 70 and then be received at the portable access device 52. As a result, the angle of departure (AOD) α, for the shown example, may be 0° or 90° and the AOA is between 0° and an angle θ. The AOA θ may be the inverse tangent of Y/X, where Y is the distance between the antenna 56 and the nearby object 70 and X is the distance between the antennas 56 and 62. FIG. 3B shows angles of arrival and departure in a multipath environment when signals are transmitted from the portable access device 52 to the vehicle 30. The RF signal may follow a direct path to the vehicle 30 and/or follow an indirect path and be reflected off the nearby object 70 and then be received at the vehicle 30. As a result, the AOD, for the shown example, is between 0° and an angle α and the AOA is 0° or 90°. The AOD α may be the inverse tangent of Y/X, where Y is the distance between the antenna 56 and the nearby object 70 and X is the distance between the antennas 56 and 62.

The access module 36 of the vehicle 30 and/or the control module 58 (shown in FIG. 2) of the portable access device 52 may determine the location of the portable access device 52 relative to the vehicle 30 based on the signals transmitted between the portable access device 52 and the vehicle 30. These determinations may be based on the AOAs and/or AODs determined by the access module 36 and/or the control module 58. The access module 36 and the control module 58 may share the AOAs, AODs and/or locations determined. The multipath error can be as much as 90° when the nearby object is positioned relative to the vehicle 30 and the portable access device 52 as shown in FIGS. 3A and 3B. By having the control module 58 determine the AOA and/or location, estimation error may be substantially reduced. This is because the AOA of a signal reflected off a nearby object and received at a portable access device is, at least for the shown example, significantly smaller than an AOA of a signal reflected off a nearby object and received at a vehicle. The further away the portable access device is from the vehicle, the more accurate the location estimation.

Figure 4:
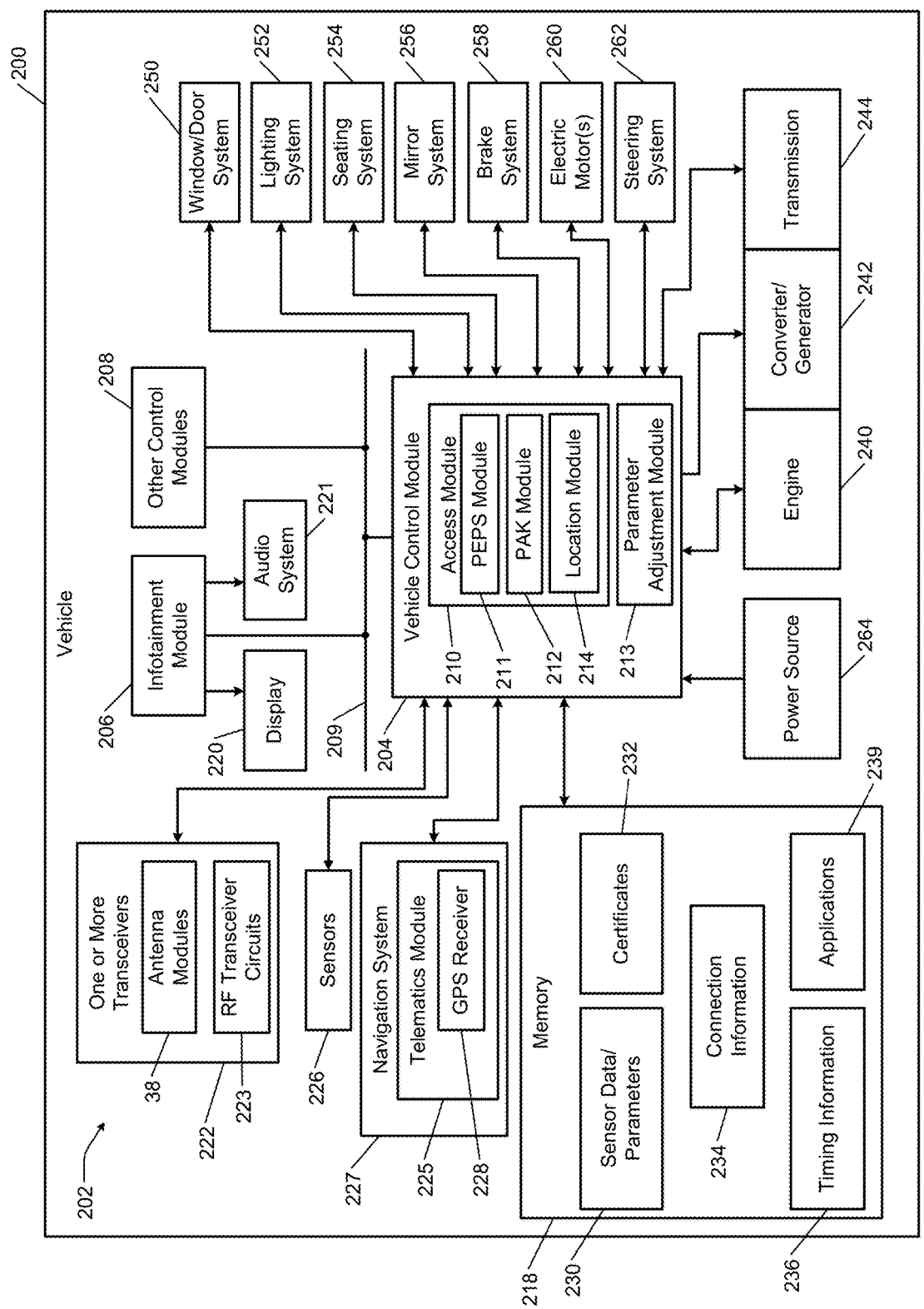
FIG. 4 a functional block diagram of an example of a vehicle including the access module in accordance with the present disclosure.
Figure 5:
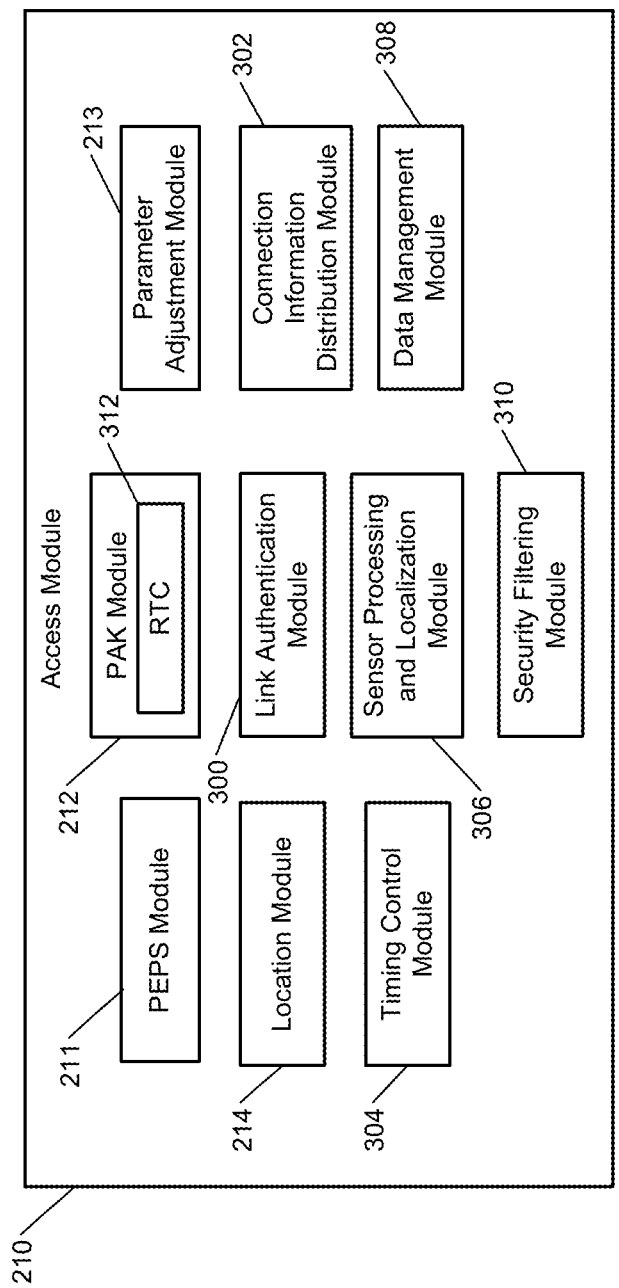
FIG. 5 is a functional block diagram of an example of the access module of FIGS. 1 and 4 in accordance with the present disclosure.

FIG. 4 shows a vehicle 200 that is an example of the vehicle 30 of FIG. 1. The vehicle 200 includes a PAK system 202, which includes a vehicle control module 204, an infotainment module 206 and other control modules 208 (e.g., a body control module). The modules 204, 206, 208 may communicate with each other via a bus 209 and/or other vehicle interface (e.g., the vehicle interface 45 of FIG. 1). As an example, the bus 209 may include a controller area network (CAN) bus, a local interconnect network (LIN) for lower data-rate communication, a clock extension peripheral interface (CXPI) bus and/or one or more other vehicle interfaces. The vehicle control module 204 may control operation of vehicles systems. The vehicle control module 204 may include an access module 210, a PEPS module 211, a PAK module 212 a parameter adjustment module 213 and a location module 214, as well as other modules, which are shown in FIG. 5. FIG. 4 is an example of when an access module (e.g., the access module 210) is implemented as a separate module from the antenna modules 38 and transceivers 222.

The vehicle control module 204 may also include one or more processors that are configured to execute instructions stored in a non-transitory computer-readable medium, such as the memory 218, which may include read-only memory (ROM) and/or random access memory (RAM).

The PEPS module 211 may perform PEPS operations to provide access to an interior of the vehicle and permit starting and/or operation of the vehicle. The PAK module 212 operates in cooperation with the PEPS module 211 and performs PAK operations as described herein. The PEPS module 211 may include the PAK module 212 or the modules 211, 212 may be implemented as a single module.

The parameter adjustment module 213 may be used to adjust parameters of the vehicle 200. The location module 214 determines AOAs, AODs and locations of portable access devices, as described herein. These features are further described below.

The PAK system 202 may further include: a memory 218; a display 220; an audio system 221; and one or more transceivers 222 including the antenna modules 38. The antenna modules 38 may include and/or be connected to RF circuits 223. The PAK system 202 may further include: a telematics module 225; sensors 226; and a navigation system 227 including a global positioning system (GPS) receiver 228. The RF circuits 223 may be used to communicate with a mobile device (e.g., the mobile device 34 of FIG. 1) including transmission of Bluetooth® signals at 2.4 giga-Hertz (GHz). The RF circuits 223 may include BLE radios, transmitters, receivers, etc. for transmitting and receiving RF signals.

The one or more transceivers 222 may include a RF transceiver including the RF circuits 223 and implement an access application having code to inspect timestamped data received and transmitted by the antenna modules 38. The access application may confirm whether the antenna modules 38 have, for example, received correct data at the correct time. The access application may be stored in the memory 218 and implemented by the PEPS module 211 and/or the PAK module 212. Other example operations of the access application are further described below.

The access application may implement a Bluetooth® protocol stack that is configured to provide a channel map, access identifier, next channel, and a time for a next channel. The access application is configured to output timing signals for timestamps for signals transmitted and received via the antenna modules 38. The access application may obtain channel map information and timing information and share this information with other modules in the vehicle.

The telematics module 225 may communicate with a server via a cell tower station. This may include the transfer of certificates, license information, and/or timing information including global clock timing information. The telematics module 225 is configured to generate location information and/or error of location information associated with the vehicle 200. The telematics module 225 may be implemented by a navigation system 227.

The sensors 226 may include sensors used for PEPS and PAK operations, cameras, objection detection sensors, temperature sensors, accelerometers, vehicle velocity sensor, and/or other sensors. The sensors 226 may include a touch sensor to detect, for example, a person touching a door handle to initiate a process of waking up a portable access device. The sensors 226 may be connected to the other control modules 208, such as the body control module, which may be in communication with LF and RF antenna circuits and/or modules disclosed herein. The GPS receiver 228 may provide vehicle velocity and/or direction (or heading) of the vehicle and/or global clock timing information.

The memory 218 may store sensor data and/or parameters 230, certificates 232, connection information 234, timing information 236, and applications 239. The applications 239 may include applications executed by the modules 38, 204, 206, 208, 210, 211, 212, 214, 223 and/or transceivers 222. As an example, the applications may include the access application, a PEPS application and/or a PAK application executed by the transceivers 222 and the modules 210, 211, 212 and/or 214. Although the memory 218 and the vehicle control module 204 are shown as separate devices, the memory 218 and the vehicle control module 204 may be implemented as a single device. The single device may include one or more other devices shown in FIG. 1.

The vehicle control module 204 may control operation of an engine 240, a converter/generator 242, a transmission 244, a window/door system 250, a lighting system 252, a seating system 254, a mirror system 256, a brake system 258, electric motors 260 and/or a steering system 262 according to parameters set by the modules 204, 206, 208, 210, 211, 212, 213, 214. The vehicle control module 204 may perform PEPS and/or PAK operations, which may include setting some of the parameters. The PEPS and PAK operations may be based on signals received from the sensors 226 and/or transceivers 222. The vehicle control module 204 may receive power from a power source 264 which may be provided to the engine 240, the converter/generator 242, the transmission 244, the window/door system 250, the lighting system 252, the seating system 254, the mirror system 256, the brake system 258, the electric motors 260 and/or the steering system 262, etc. Some of the PEPS and PAK operations may include unlocking doors of the window/door system 250, enabling fuel and spark of the engine 240, starting the electric motors 260, powering any of the systems 250, 252, 254, 256, 258, 262, and/or performing other operations as are further described herein.

The engine 240, the converter/generator 242, the transmission 244, the window/door system 250, the lighting system 252, the seating system 254, the mirror system 256, the brake system 258, the electric motors 260 and/or the steering system 262 may include actuators controlled by the vehicle control module 204 to, for example, adjust fuel, spark, air flow, steering wheel angle, throttle position, pedal position, door locks, window position, seat angles, etc. This control may be based on the outputs of the sensors 226, the navigation system 227, the GPS 228 and the above-stated data and information stored in the memory 218.

FIG. 5 shows the access module 210. The access module 210 includes the PEPS module 211, the PAK module 212, the parameter adjustment module 213, the location module 214 and may further include a link authentication module 300, a connection information distribution module 302, a timing control module 304, a sensor processing and localization module 306, a data management module 308 and a security filtering module 310. The PAK module 212 may include a real time clock (RTC) 312 that maintains a local clock time.

The link authentication module 300 may authenticate the portable access devices of FIG. 1 and establish the secure communication link. For example, the link authentication module 300 can be configured to implement challenge-response authentication or other cryptographic verification algorithms in order to authenticate the portable access devices.

The connection information distribution module 302 is configured to communicate with some of the sensors 226 of FIG. 4 and provide the sensors with communication information necessary for the sensors to find and then follow, or eavesdrop on, the secure communication link. This may occur once the sensors are synchronized with a communication gateway, which may be included in or implemented by one of the transceivers 222. As an example, the vehicle 200 and/or the PAK system 202 may include any number of sensors disposed anywhere on the vehicle 200 for detecting and monitoring mobile devices. The connection information distribution module 302 is configured to obtain information corresponding to communication channels and channel switching parameters of a communication link and transmit the information to the sensors 226. In response to the sensors 226 receiving the information from the connection information distribution module 302 via a bus or other vehicle interface disclosed herein and the sensors 226 being synchronized with the communication gateway, the sensors 226 may locate and follow, or eavesdrop on, the communication link.

The timing control module 304 may: maintain the RTC and/or currently stored date if not handled by the PAK module 212; disseminate current timing information with the sensors; generate timestamps for incoming and outgoing messages, requests, signals, certificates, and/or other items; calculate round trip times; etc. A round trip time may refer to the amount between when a request is generated and/or transmitted and a time when a response to the request is received. The timing control module 304 may obtain timing information corresponding to a communication link when the link authentication module 300 executes challenge-response authentication. The timing control module 304 is also configured to provide the timing information to the sensors 226 via the vehicle interface 209.

After link authentication is established, the data management module 308 collects the current location of the vehicle 200 from the telematics module 225 and may share the location with the portable access devices. The portable access devices optionally include GPS modules and application software that when executed compares the estimated relative locations of the portable access devices to the vehicle 200. This may be done in addition to the other location determination operations described herein, which may be performed by the location module 214. Based on the estimated positions of the portable access devices relative to the vehicle 108, the portable access devices may send signals to one of the transceivers 222 requesting the vehicle to perform certain actions. As an example, the data management module 308 is configured obtain vehicle information obtained by any of the modules (e.g., location information obtained by a telematics module 225) and transmit the vehicle information to the portable access devices.

The security filtering module 310 detects violations of a physical layer and protocol and filter data accordingly before providing information to the sensor processing and localization module 306. The security filtering module 310 flags data as injected such that the sensor processing and localization module 306 is able to discard data and alert the PEPS module 211. The data from the sensor processing and localization module 306 is passed along to the PEPS module 211, whereby the PEPS module 211 is configured to read vehicle state information from the sensors in order to detect user intent to access a feature and to compare the location of the mobile device to a set of locations that authorize certain vehicle features, such as unlocking a door or trunk of the vehicle and/or starting the vehicle.

Figure 6:
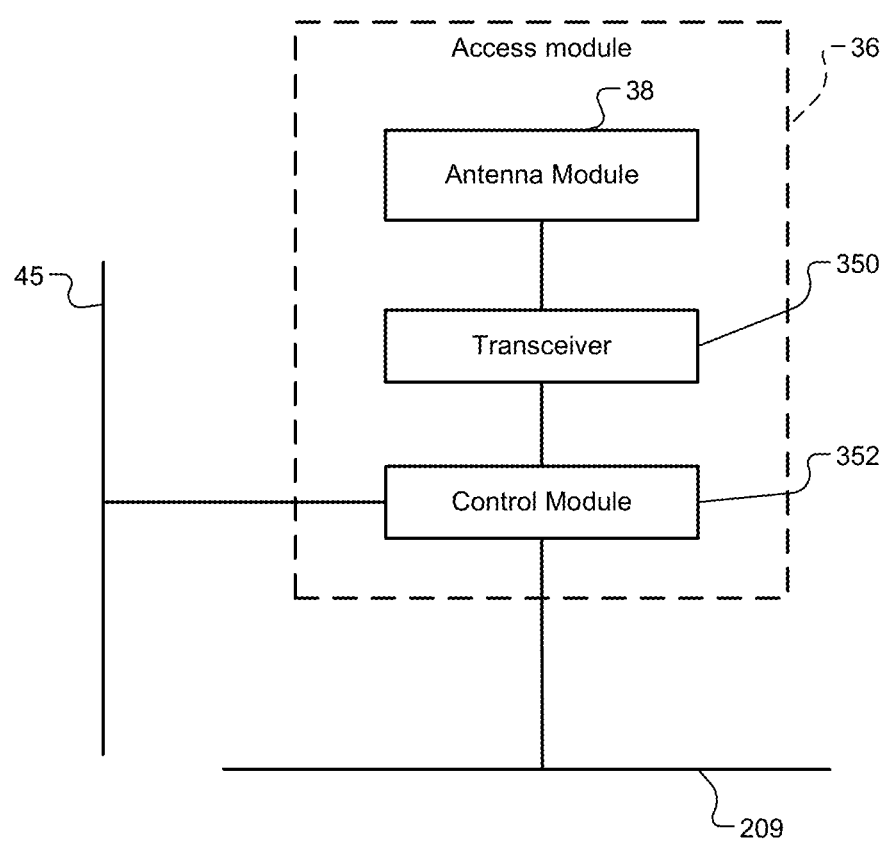
FIG. 6 is a functional block diagram of an example of the access module of FIG. 1 in accordance with the present disclosure.

FIG. 6 is an example of the access module 36 of FIG. 1. The access module 36 may include an antenna module 38, a transceiver 350 and a control module 352. The control module 352 may be implemented similarly as the access module 210 of FIGS. 4 and 5. The transceiver 350 may be configured to transmit and/or receive LF, RF, UHF, BLE and/or UWB signals. The control module 352 may include or be part of a BLE communication chipset and/or include or be part of a Wi-Fi or Wi-Fi direct communication chipset. Some or all of the operations of the control module 352 may be implemented by one or more of the modules 204, 210, 211, 212, 214 of FIG. 4.

The control module 352 (or one or more of the modules 204, 210, 211, 212 of FIG. 4) may establish a secure communication connection with a portable access device (e.g., one of the portable access devices 32, 34 of FIG. 1). For example, the control module 352 may establish a secure communication connection using the BLE communication protocol this may include transmitting and/or receiving timing and synchronization information. The timing and synchronization information may include information directed to the secure communication connection, such as timing of next communication connection events, timing intervals between communication connection events, communication channels for next communication connection events, a channel map, a channel hop interval or offset, communication latency information, communication jitter information, etc. The control module 352 may detect (or "eavesdrop") packets sent by the portable access device to the vehicle control module 204 and measure signal information of the signals received from the portable access device. The channel hop interval or offset may be used to calculate a channel for a subsequent communication connection event.

The control module 352 may measure a received signal strength of a signal received from the portable access device and generate a corresponding RSSI value. Additionally or alternatively, the control module 352 may take other measurements of transmitted and received signals from the portable access device, such as an angle of arrival, an angle of departure, a time of flight, a time of arrival, a time difference of arrival, etc. These measurements may be used in determining phase determination, standard deviation of AOA, standard deviation of RSSI, standard deviation of phase, and other parameters, some of which are described below. As an example, time of flight calculations may be made to measure time of flight of UWB signals. The control module 352 may then send the measured information to the vehicle control module 204, which may then determine a location of and/or distance to the portable access device relative to the vehicle 30 based on the measured information. The location and distance determinations may be based on similar information received from one or more other antenna modules and/or other sensors.

As an example, the vehicle control module 204 may determine the location of the portable access device based on, for example, the patterns of the RSSI values corresponding to signals received from the portable access device by the antenna modules 38. A strong (or high) RSSI value indicates that the portable access device is close to the vehicle 30 and a weak (or low) RSSI value indicates that the portable access device is further away from the vehicle 30. By analyzing the RSSI values, the control module 204 may determine a location of and/or a distance to the portable access device relative to the vehicle 30. Additionally or alternatively, angle of arrival, angle of departure, round trip timing, unmodulated carrier tone exchange, or time difference of arrival measurements for the signals sent between the portable access device and the control module 204 may also be used by the control module 204 or the portable access device to determine the location of the portable access device. Additionally or alternatively, the antenna modules 38 may determine the location of and/or distance to the portable access device based on the measured information and communicate the location or distance to the control module 204.

Based on the determined location of or distance to the portable access device relative to the vehicle 30, the modules 211, 212 of FIG. 4 may then authorize and/or perform a vehicle function, such as unlocking a door of the vehicle 30, unlocking a trunk of the vehicle 30, starting the vehicle 30, allowing the vehicle 30 to be started, and/or other functions, some of which are described herein. As another example, if the portable access device is less than a first predetermined distance from the vehicle 30, the modules 211, 212 may activate interior or exterior lights of the vehicle 30. If the portable access device is less than a second predetermined distance from the vehicle 30, the modules 211, 212 may unlock doors or a trunk of the vehicle 30. If the portable access device is located inside of the vehicle 30, the modules 211, 212 may allow the vehicle 30 to be started. Based on the determined location of or distance to the portable access device relative to the vehicle 30, the polling reduction module 214 may also perform certain operations as further described below.

Figure 7:
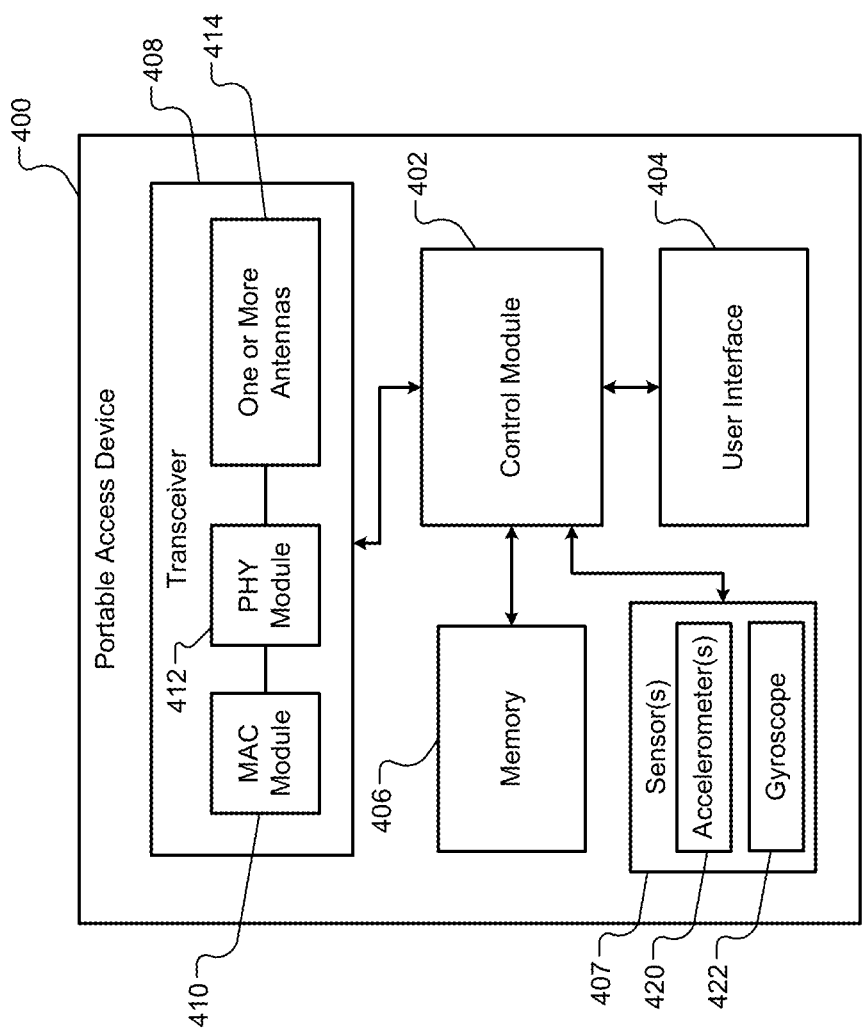
FIG. 7 is a functional block diagram of an example of a portable access device in accordance with an embodiment of the present disclosure.

FIG. 7 shows an example portable access device 400, which is an example of one of the portable access devices 32, 34 of FIG. 1 and the portable access device 52 of FIG. 2. The portable access device 400 may include a control module 402, a user interface 404, a memory 406, sensors 407 and a transceiver 408. The transceiver 408 may include a MAC module 410, a PHY module 412 and one or more antennas 414.

The control module 402 may include or be part of a BLE communication chipset. Alternatively, the control module 402 may include or be part of a Wi-Fi or Wi-Fi direct communication chipset. The memory 406 may store application code that is executable by the control module 402. The memory 406 may be a non-transitory computer-readable medium including read-only memory (ROM) and/or random-access memory (RAM).

The control module 402 communicates with the modules 204 and 350 of the vehicle and performs authentication and other operations as further described below. The control module 402 may transmit information regarding the portable access device 400, such as location, heading and/or velocity information obtained from one or more of the sensors 407 (e.g., a global navigation satellite system (e.g., GPS) sensor, an accelerometer, a gyroscope, and/or an angular rate sensor). In the example shown, the sensors 407 include one or more accelerometers 420 and/or a gyroscope 422. The user interface 404 may include a key pad, a touch screen, a voice activated interface, and/or other user interface.

The control module 402 may operate similarly as the control module 58 of FIG. 2. The control module 402 may determine AOAs, AODs, phases, and/or other signal information, such as RSSI values. The control module 402 may also determine a location of the portable access device 400 and/or speed and heading of the portable access device 400. This information may be shared with an access module of a vehicle, such as any of the access modules disclosed herein. The control module 402 may also determine standard of deviation of phase for different channels (or frequencies), standard of deviation of RSSI values of different channels, etc. and share this information with the access module.

Figure 8:
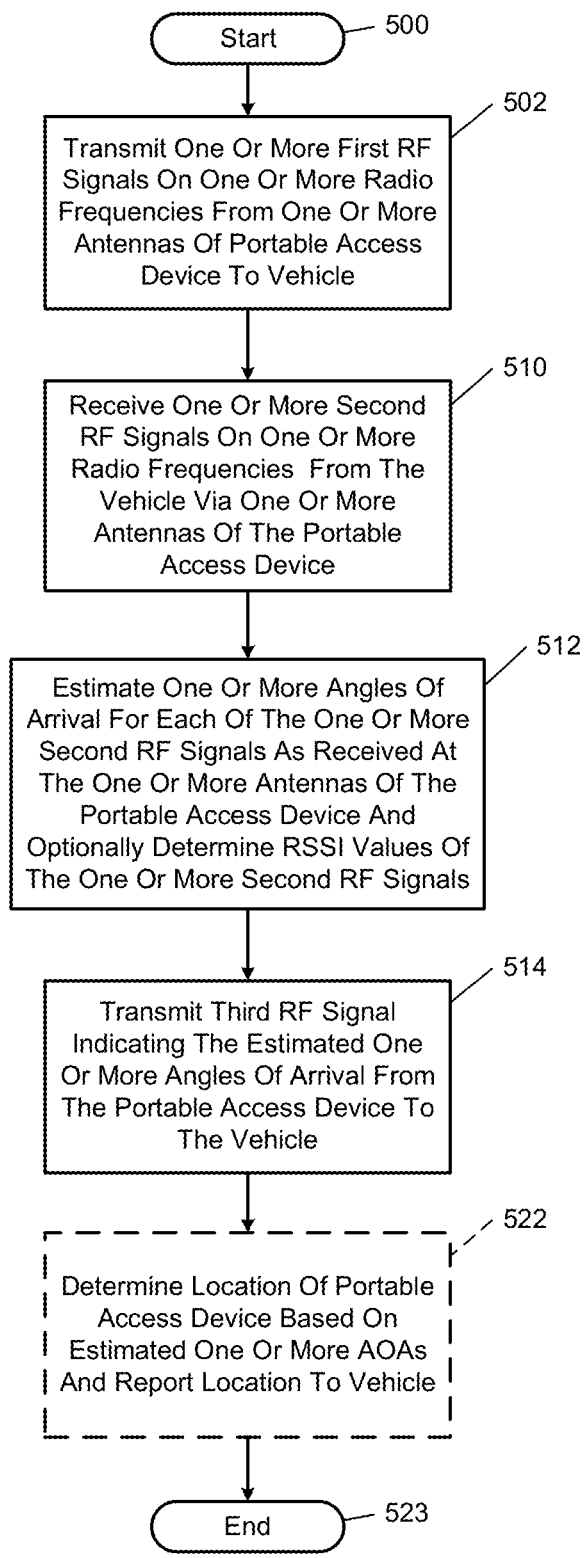
FIG. 8 illustrates a first portion of an access method implemented via a control module of a portable access device in accordance with the present disclosure.
Figure 9:
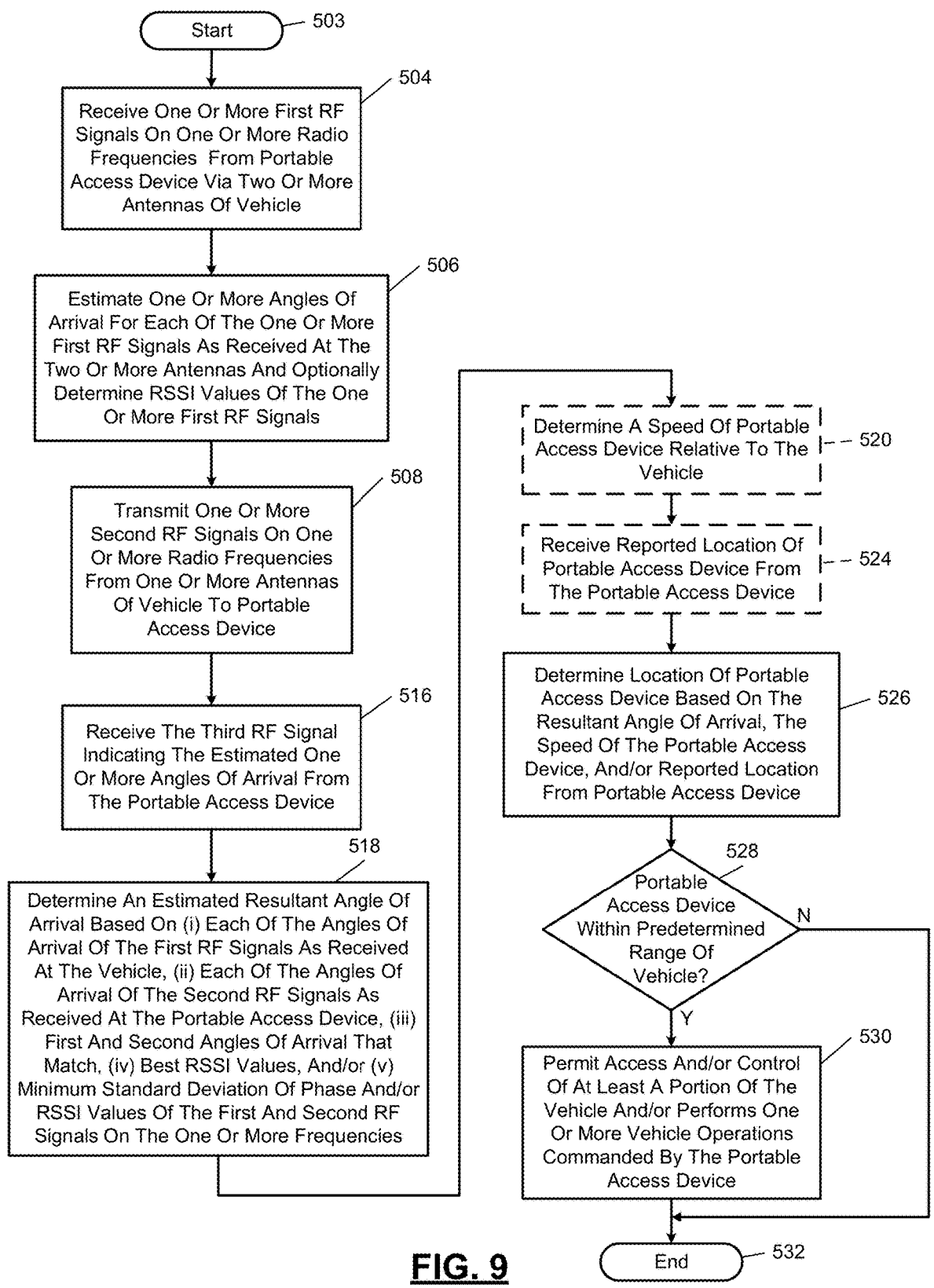
FIG. 9 illustrates a second portion of the access method implemented via an access module of a vehicle in accordance with the present disclosure.

Operations of the access modules of the vehicles and control modules of the portable access devices disclosed herein are further described below with respect to the access method of FIGS. 8-10. FIGS. 8-9 show first and second portions of the access method. The first portion is implemented via a control module of a portable access device. The second portion is implemented by an access module of a vehicle. The operations of the first portion of FIG. 8 correspond with the operations of the second portion of FIG. 9. The operation numbers of FIGS. 8-9 are provided as an example of the order in which the operations may be performed. This order of the operations is provided as an example; the operations may be performed in a different order and/or overlap in time.

Although the following operations are primarily described with respect to determining AOAs, AODs may also or alternatively be determined and evaluated in a similar manner. This is further described below. Although the following operations are primarily described with respect to the implementations of FIGS. 1-7, the operations may be easily modified to apply to other implementations of the present disclosure. The operations may be iteratively performed.

The first portion of the access method may begin at 500. At 502, the control module transmits one or more first RF signals (e.g., BLE signals) on one or more radio frequencies (or channels) from one or more antennas of the portable access device to the vehicle. Each RF signal may be transmitted by the one or more antennas. Multiple RF signals may be transmitted on multiple radio frequencies.

The second portion of the method may begin at 503. At 504, the access module of the vehicle receives the one or more first RF signals on the one or more radio frequencies from the portable access device via two or more antennas. Each of the RF signals may be received on two or more antennas in order to determine the AOA of each of the RF signals.

At 506, the access module estimates one or more AOAs for each of the one or more first RF signals and optionally determines the RSSI value of each of the one or more first RF signals for each of the one or more radio frequencies.

At 508, the access module transmits one or more second RF signals a one or more radio frequencies from one or more antennas of the vehicle to the portable access device. In one embodiment, the one or more second RF signals are on the same radio frequencies as the one or more first RF signals.

At 510, the control module receives the one or more second RF signals on the one or more radio frequencies from the vehicle via the one or more antennas of the portable access device.

At 512, the control module estimates one or more AOAs for each of the one or more second RF signals as received at the portable access device. The control module may receive the second RF signals on two or more antennas. The control module may also determine RSSI values of the second RF signals.

At 514, the control module transmits a third RF signal indicating the estimated one or more AOAs from the portable access device to the vehicle. At 516, the access module receives the third RF signal from the portable access device.

At 518, the control module determines an estimated resultant AOA based on: (i) each of the AOAs of the first RF signals; (ii) each of the AOAs of the second RF signals; (iii) first and second AOAs that match and/or are in alignment with each other; (iv) best RSSI values of the first and second RF signals; and/or (v) minimum standard deviation of phase and/or RSSI values of the first and second RF signals on the respective radio frequencies. A first AOA may be in alignment with the second AOA, for example, if the difference between the first and second AOAs is less than a predetermined amount (e.g., less than 5°). Examples of how the resultant AOA may be determined are described below with respect to the AOA estimation method of FIG. 10.

At 520, the access module may determine the speed and heading of the portable access device relative to the vehicle. The speed and heading may be determined by the control module of the portable access device and shared with the access module. The access module may operate as a "speed filter" and permit subsequent operations if the portable access device is, for example, moving towards the vehicle and/or is moving at a speed within a predetermined range.

At 522, the control module of the portable access device may determine a location of the portable access device based on the estimated one or more AOAs and report the location to the vehicle. The first portion of the method may end at 523. At 524, the access module of the vehicle may receive the reported location of the portable access device.

At 526, the access module determines the location of the portable access device based on the resultant AOA, the speed and heading of the portable access device, and/or the reported location of the portable access device. The speed and heading may be used to track movement of the portable access device. When the location of the portable access device is determined, the portable access device may be authenticated using an authentication process.

At 528, the access module determines whether the portable access device is within a predetermined range of the vehicle. If yes, operation 530 is performed, otherwise the method may end at 532.

At 530, the access module permits access and/or control of at least a portion of the vehicle and/or performs one or more vehicle operations commanded by the portable access device, as described above. The access and/or control may be based on whether the portable access device has been authenticated and/or determined to be an authorized device. The second portion of the method may end at 532.

Figure 10:
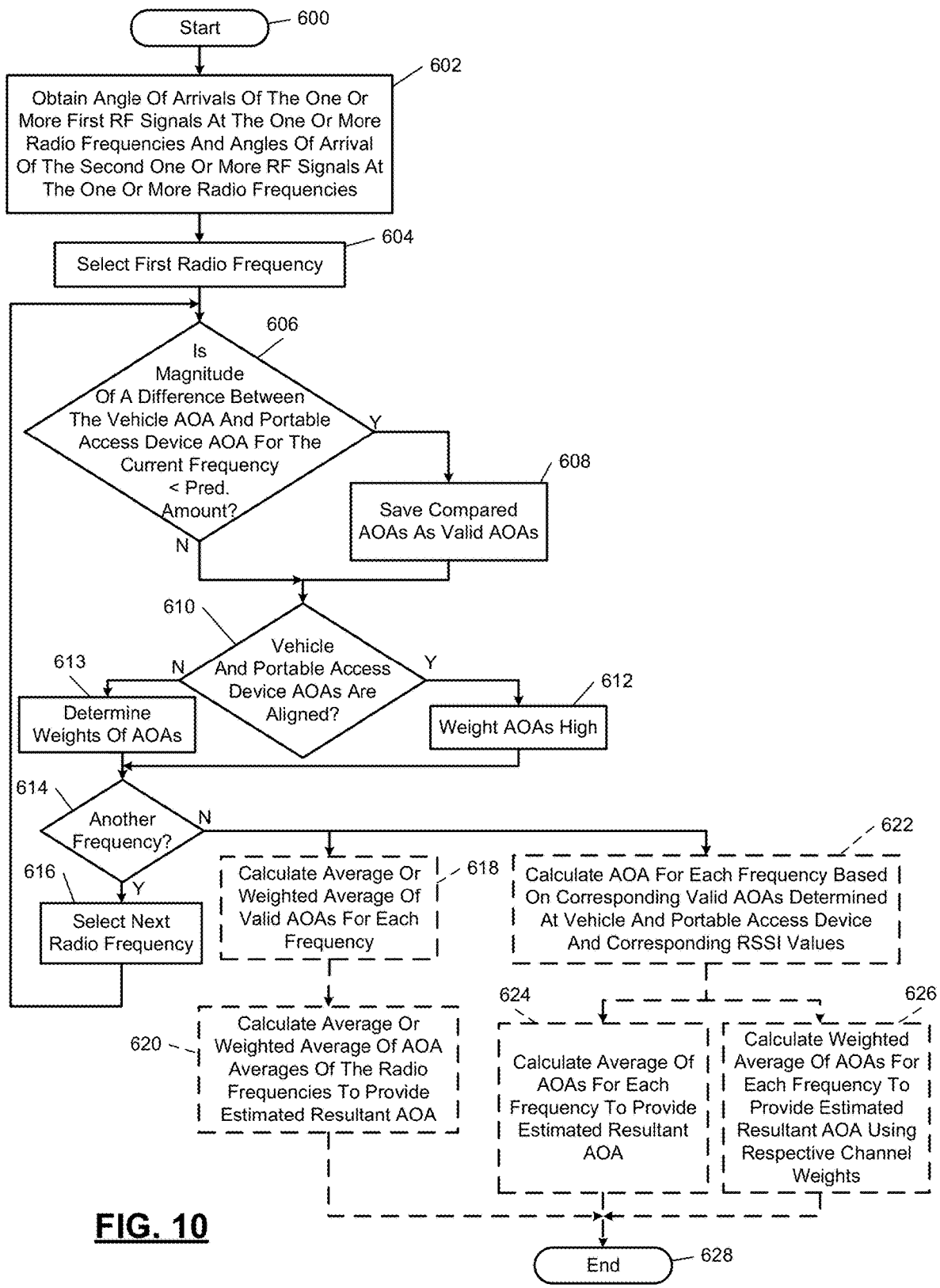
FIG. 10 illustrates a third portion of the access method referred to as an AOA estimation method implemented at the access module of the vehicle in accordance with the present disclosure.

FIG. 10 shows a third portion of the access method referred to as an AOA estimation method implemented at the access module of the vehicle. Although the AOA estimation method is primarily described with respect to determining AOAs and a resultant AOA via the access module of the vehicle, the AOA estimation method may be modified to be based on AODs and/or may be performed similarly by the control module of the portable access device and results thereof may be shared with the vehicle.

The AOA estimation method may start at 600. At 602, the access module obtains the AOAs of the first RF signals and the AIA of the second RF signals for the corresponding radio frequencies. The AOAs may be stored in memory of the vehicle and/or provided by the control module of the portable access device.

At 604, the access module may select a first one of the radio frequencies to start with for comparing the corresponding first and second AOAs. At 606, the access module determines whether a magnitude of a difference between the vehicle AOA and the portable access device AOA for the current frequency is less than a predetermined amount (e.g., less than 45°). If less than the predetermined amount, then operation 608 is performed.

At 608, the access module saves the compared AOAs for the current frequency as valid AOAs for subsequent calculations, such as for AOA averaging.

At 610, the access module determines whether the vehicle and portable access device AOA are aligned. The AOAs may be aligned if a difference between the AOAs is less than a second predetermined amount (e.g., less than 5°). The second predetermined amount may be adjusted based on, for example, the environment in which the vehicle and portable access device are located. For example, a different value may be used if the vehicle is in a parking garage or in a congested city as opposed to being in an open non-congested environment. If less than the second predetermined amount, then operation 612 is performed, otherwise operation 613 may be performed. At 612, the access module may determine and/or apply high weights for the AOAs. As an example, each of the weights referred to herein may be a value between 0-1. A high weight value may be equal to or close to 1. At 613, weights of the valid AOAs may be determined. Since the valid AOAs are not aligned, the weights are set lower than set at 612 and may be based on the difference between the AOAs. The larger the difference the smaller the weight.

At 614, the access module determines whether there is another frequency to evaluate. If yes, operation 616 is performed. At 616, the access module selects a next frequency. Operation 606 may be performed after operation 616.

At 618, the access module calculates an average or weighted average of the valid AOAs for each of the frequencies. The weights determined at 612 and 613 may be used to calculate the weighted average. At 620, the access module calculates an average or weighted average of the AOA averages determined at 618 to provide an estimated resultant AOA, which may be used at operation 526.

At 622, the access module may calculate an AOA for each frequency based on corresponding valid AOAs determined at the vehicle and the portable access device and corresponding RSSI values. As an example, equation 1 may be used to determine the AOA for each frequency, where $\theta_{f,car}$ is the AOA estimation as seen at the vehicle at a frequency f, $\theta_{f,m}$ is the AOA estimation as seen at the portable access device at the frequency f, $\theta_f$ is the AOA for the particular frequency f, $RSSI_{f,car}$ is the RSSI value determined at the vehicle for the frequency f, and $RSSI_{f,m}$ is the RSSI value determined at the portable access device for the frequency f. As an example, the AOA $\theta_f$ may be calculated for 37 difference frequencies.

$$\theta_f = \frac{RSSI_{f,car}\theta_{f,car} + RSSI_{f,m}\theta_{f,m}}{RSSI_{f,car} + RSSI_{f,m}} \quad (1)$$

At 624, the access module may calculate the average of the AOAs for each frequency to provide an estimated resultant AOA, which may be used at operation 526. The AOAs of different frequencies may be the same unless multipath transmission in a current environment is frequency dependent.

At 626, the access module may calculate a weighted average of the AOAs for each of the frequencies to provide an estimated resultant AOA using respective channel weights. The resultant AOA may be determined using, for example, equations 2 and 3, where $\theta_{resultant}$ is the resultant AOA, $C_f$ is the weight for the frequency f, and $\theta_f$ is the AOA for the frequency f. The function sum is used to determine a sum of the products of the weights and the AOAs and a sum of the weights for the radio frequencies.

$$\theta_{resultant} = \frac{sum(C_f \theta_f)}{sum(C_f)} \quad (2)$$

$$C_f = \frac{1}{|\theta_{f,car} - \theta_{f,m}|} \quad (3)$$

Equation 3 provides an example of how the weights may be calculated. In an embodiment, the channels with less multipath interference may be provided with a higher weight, than a channel with a larger amount of multipath interference. The method may end at 628.

In one embodiment, a resultant AOA may be selected based on the channels with a high RSSI and/or having AOAs that are within a predetermined amount from a standard deviation (referred to as a minimum standard deviation) of an average of the valid AOAs of the radio frequencies. The AOAs determined for the channels with high deviation from the average may be dropped.

In one embodiment, if there is no direct path of transmission between the vehicle and the portable access device and/or there is no match between the AOAs determined by the access module and the control module for a frequency, the access module may rely more heavily or solely on the RSSI values and/or corresponding standards of deviation when determining the location of the portable access device. The RSSI values include the RSSI values determined by the access module and/or the control module.

In another embodiment, when the portable access device includes only a single antenna, the control module may determine AODs instead of determining AOAs. The AODs may be compared with the AOAs determined by the access module. Differences may be weighted and a resultant AOA may be determined based on the AOAs, the AODs, and/or the differences. This may be accomplished using similar techniques as described above. In another embodiment, when the portable access device includes multiple antennas, the control module determines AOAs as described above.

The above-described operations of FIGS. 8-10 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

Since the multipath effects are typically not reciprocal (do not affect signal attributes in the same way when transmitted in a reverse direction), by monitoring signal characteristics of signals transmitted in opposite directions, multipath effects are minimized and/or removed using the techniques described herein. The AOAs and/or AODs may be determined at both a vehicle and a portable access device over multiple frequencies to determine a best AOA and/or AOD of transmitted signals.

In the present disclosure, a system is provided and includes a first transceiver and an access module. The first transceiver is implemented at a vehicle and configured to (i) receive a first radio frequency signal from a portable access device via multiple antennas, (ii) transmit a second radio frequency signal from the vehicle to the portable access device, and (iii) receive a third radio frequency signal from the portable access device. The third radio frequency signal indicates at least one of (i) an angle of departure of the first radio frequency signal, or (ii) a second angle of arrival of the second radio frequency signal as received at the portable access device. The access module is configured to: estimate a first angle of arrival of the first radio frequency signal; determine a resultant angle of arrival based on the first angle of arrival and at least one of (i) the angle of departure, or (ii) the second angle of arrival; determine a first location of the portable access device relative to the vehicle based on the resultant angle of arrival; and permit at least one of access to the vehicle or control of a portion of the vehicle based on the first location of the portable access device.

In other features, the first radio frequency signal and the second radio frequency signal are at an ultra-high frequency low energy frequency.

In other features, the first radio frequency signal and the second radio frequency signal are at 2.4 GHz.

In other features, the access module is configured to: weight the first angle of arrival; weight at least one of (i) the angle of departure, or (ii) the second angle of arrival; and determine the resultant angle of arrival based on the weighted first angle of arrival and the weighted at least one of (i) the angle of departure, or (ii) the second angle of arrival.

In other features, the access module is configured to: at least one of determine or obtain a first received signal strength indicator associated with the first radio frequency signal and a second received signal strength indicator associated with the second radio frequency signal; and based on the first received signal strength indicator and the second received signal strength indicator, determine the resultant angle of arrival.

In other features, the transceiver is configured to (i) receive a first radio frequency signals from the portable access device via the antennas, (ii) transmit a second radio frequency signals from the vehicle to the portable access device via one or more of the antennas, and (iii) receive the third radio frequency signal from the portable access device. The third radio frequency signal indicates at least one of (i) angles of departure of the first radio frequency signals, or (ii) second angles of arrival of the second radio frequency signals as received at the portable access device. The first radio signals include the first radio frequency signal. The second radio frequency signals include the second radio frequency signal. The access module is configured to: estimate first angles of arrival of the first radio frequency signals; and determine the resultant angle of arrival based on the first angles of arrival and at least one of (i) the angles of departure, or (ii) the second angles of arrival.

In other features, the access module is configured to: determine differences between the first angles of arrival and the at least one of (i) the angles of departure, or (ii) the second angles of arrival; drop the differences that are greater than or equal to a predetermined value; and determine the resultant angle of arrival based on the first angles of arrival and the at least one of (i) the angles of departure, or (ii) the second angles of arrival, which have corresponding differences that are less than the predetermined value.

In other features, the access module is configured to: determine differences between the first angles of arrival and the at least one of (i) the angles of departure, or (ii) the second angles of arrival; weight the differences; and determine the resultant angle of arrival based on the weighted differences.

In other features, the access module is configured to: calculate at least one of an angle of arrival or an angle of departure for each of multiple radio frequencies; at least one of determine or obtain multiple signal strength indicators associated with the radio frequencies; and determine the resultant angle of arrival based on at least one of (i) the angles of arrival for the radio frequencies, (ii) the angles of departure for the radio frequencies, or (iii) the received signal strength indicators.

In other features, the access module is configured to determine a speed of the portable access device, and based on the speed, determine the location of the portable access device.

In other features, the system further includes: the portable access device; a second transceiver; and a control module implemented in the portable access device and configured to transmit the first radio frequency signal and the third radio frequency signal via the second transceiver.

In other features, the second transceiver is configured to (i) transmit first radio frequency signals from the portable access device via one or more antennas, (ii) receive second radio frequency signals from the vehicle via the one or more antennas, and (iii) transmit the third radio frequency signal from the portable access device to the vehicle, wherein the third radio frequency signal indicates at least one of (i) angles of departure of the first radio frequency signals, or (ii) second angles of arrival of the second radio frequency signals as received at the portable access device. The first radio signals include the first radio frequency signal. The second radio frequency signals include the second radio frequency signal. The control module is configured to estimate at least one of (i) the angles of departure, or (ii) the second angles of arrival.

In other features, the control module is configured to determine a location of the portable access device relative to the vehicle and report the location determined by the control module to the vehicle; and the access module is configured to determine the first location of the portable access device based on the location reported by the control module.

In other features, a method is provided and includes: receiving a first radio frequency signal from a portable access device via antennas at a first transceiver, where the first transceiver is implemented in a vehicle; transmitting a second radio frequency signal from the vehicle to the portable access device; receiving a third radio frequency signal from the portable access device at the first transceiver, where the third radio frequency signal indicates a second angle of arrival of the second radio frequency signal as received at the portable access device; estimating a first angle of arrival of the first radio frequency signal; determining a resultant angle of arrival based on the first angle of arrival and the second angle of arrival; determining a first location of the portable access device relative to the vehicle based on the resultant angle of arrival; and permitting at least one of access to the vehicle or control of a portion of the vehicle based on the first location of the portable access device.

In other features, the method further includes: weighting the first angle of arrival; weighting the second angle of arrival; and determining the resultant angle of arrival based on the weighted first angle of arrival and the weighted second angle of arrival.

In other features, the method further includes: at least one of determining or obtaining a first received signal strength indicator associated with the first radio frequency signal and a second received signal strength indicator associated with the second radio frequency signal; and based on the first received signal strength indicator and the second received signal strength indicator, determine the resultant angle of arrival.

In other features, the method further includes: receiving first radio frequency signals from the portable access device via the antennas; transmitting second radio frequency signals from the vehicle to the portable access device via one or more of the antennas; receiving the third radio frequency signal from the portable access device, where the third radio frequency signal indicates second angles of arrival of the second radio frequency signals as received at the portable access device, where the first radio signals include the first radio frequency signal, and where the second radio frequency signals include the second radio frequency signal; estimating first angles of arrival of the first radio frequency signals; and determining the resultant angle of arrival based on the first angles of arrival and the second angles of arrival.

In other features, the method further includes: determining differences between the first angles of arrival and the second angles of arrival; dropping the differences that are greater than or equal to a predetermined value; weighting remaining differences; and determining the resultant angle of arrival based on the weighted differences.

In other features, the method further includes: calculating an angle of arrival for each of multiple radio frequencies; at least one of determining or obtaining received signal strength indicators associated with the radio frequencies; and determining the resultant angle of arrival based on the angles of arrival for the radio frequencies and the received signal strength indicators.

In other features, the method further includes: transmitting first radio frequency signals from the portable access device via one or more antennas to the vehicle; receiving second radio frequency signals from the vehicle via the one or more antennas; estimating second angles of arrival of the second radio frequency signals; and transmitting the third radio frequency signal from the portable access device to the vehicle, where the third radio frequency signal indicates the second angles of arrival of the second radio frequency signals as received at the portable access device, where the first radio signals include the first radio frequency signal, and where the second radio frequency signals include the second radio frequency signal.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a first transceiver implemented at a vehicle and configured to (i) receive a first radio frequency signal from a portable access device via a plurality of antennas, (ii) transmit a second radio frequency signal from the vehicle to the portable access device, and (iii) receive a third radio frequency signal from the portable access device, wherein the third radio frequency signal indicates at least one of (i) an angle of departure of the first radio frequency signal, or (ii) a second angle of arrival of the second radio frequency signal as received at the portable access device; and
an access module configured to
estimate a first angle of arrival of the first radio frequency signal,
determine a resultant angle of arrival based on the first angle of arrival and at least one of (i) the angle of departure, or (ii) the second angle of arrival,
determine a first location of the portable access device relative to the vehicle based on the resultant angle of arrival, and
permit at least one of access to the vehicle or control of a portion of the vehicle based on the first location of the portable access device.

2. The system of claim 1, wherein the first radio frequency signal and the second radio frequency signal are at an ultra-high frequency low energy frequency.

3. The system of claim 1, wherein the first radio frequency signal and the second radio frequency signal are at 2.4 GHz.

4. The system of claim 1, wherein the access module is configured to:
weight the first angle of arrival;
weight at least one of (i) the angle of departure, or (ii) the second angle of arrival; and
determine the resultant angle of arrival based on the weighted first angle of arrival and the weighted at least one of (i) the angle of departure, or (ii) the second angle of arrival.

5. The system of claim 1, wherein the access module is configured to:
at least one of determine or obtain a first received signal strength indicator associated with the first radio frequency signal and a second received signal strength indicator associated with the second radio frequency signal; and
based on the first received signal strength indicator and the second received signal strength indicator, determine the resultant angle of arrival.

6. The system of claim 1, wherein:
the transceiver is configured to (i) receive a first plurality of radio frequency signals from the portable access device via the plurality of antennas, (ii) transmit a second plurality of radio frequency signals from the vehicle to the portable access device via one or more of the plurality of antennas, and (iii) receive the third radio frequency signal from the portable access device, wherein the third radio frequency signal indicates at least one of (i) angles of departure of the first radio frequency signals, or (ii) second angles of arrival of the second plurality of radio frequency signals as received at the portable access device, wherein the first plurality of radio signals include the first radio frequency signal, and wherein the second plurality of radio frequency signals include the second radio frequency signal; and
the access module is configured to
estimate first angles of arrival of the first plurality of radio frequency signals, and
determine the resultant angle of arrival based on the first angles of arrival and at least one of (i) the angles of departure, or (ii) the second angles of arrival.

7. The system of claim 6, wherein the access module is configured to:
determine differences between the first angles of arrival and the at least one of (i) the angles of departure, or (ii) the second angles of arrival;
drop the differences that are greater than or equal to a predetermined value; and
determine the resultant angle of arrival based on the first angles of arrival and the at least one of (i) the angles of departure, or (ii) the second angles of arrival, which have corresponding differences that are less than the predetermined value.

8. The system of claim 6, wherein the access module is configured to:
determine differences between the first angles of arrival and the at least one of (i) the angles of departure, or (ii) the second angles of arrival;
weight the differences; and
determine the resultant angle of arrival based on the weighted differences.

9. The system of claim 6, wherein the access module is configured to:
calculate at least one of an angle of arrival or an angle of departure for each of a plurality of radio frequencies;
at least one of determine or obtain a plurality of received signal strength indicators associated with the plurality of radio frequencies; and
determine the resultant angle of arrival based on at least one of (i) the angles of arrival for the plurality of radio frequencies, (ii) the angles of departure for the plurality of radio frequencies, or (iii) the plurality of received signal strength indicators.

10. The system of claim 1, wherein the access module is configured to determine a speed of the portable access device, and based on the speed, determine the location of the portable access device.

11. The system of claim 1, further comprising:
the portable access device;
a second transceiver; and
a control module implemented in the portable access device and configured to transmit the first radio frequency signal and the third radio frequency signal via the second transceiver.

12. The system of claim 11, wherein:
the second transceiver is configured to (i) transmit a first plurality of radio frequency signals from the portable access device via one or more antennas, (ii) receive a second plurality of radio frequency signals from the vehicle via the one or more antennas, and (iii) transmit the third radio frequency signal from the portable access device to the vehicle, wherein the third radio frequency signal indicates at least one of (i) angles of departure of the first plurality of radio frequency signals, or (ii) second angles of arrival of the second plurality of radio frequency signals as received at the portable access device, wherein the first plurality of radio signals include the first radio frequency signal, and wherein the second plurality of radio frequency signals include the second radio frequency signal; and
the control module is configured to estimate at least one of (i) the angles of departure, or (ii) the second angles of arrival.

13. The system of claim 11, wherein:
the control module is configured to determine a location of the portable access device relative to the vehicle and report the location determined by the control module to the vehicle; and
the access module is configured to determine the first location of the portable access device based on the location reported by the control module.

14. A method comprising:
receiving a first radio frequency signal from a portable access device via a plurality of antennas at a first transceiver, where the first transceiver is implemented in a vehicle;
transmitting a second radio frequency signal from the vehicle to the portable access device;
receiving a third radio frequency signal from the portable access device at the first transceiver, wherein the third radio frequency signal indicates a second angle of arrival of the second radio frequency signal as received at the portable access device;
estimating a first angle of arrival of the first radio frequency signal;
determining a resultant angle of arrival based on the first angle of arrival and the second angle of arrival;
determining a first location of the portable access device relative to the vehicle based on the resultant angle of arrival; and
permitting at least one of access to the vehicle or control of a portion of the vehicle based on the first location of the portable access device.

15. The method of claim 14, further comprising:
weighting the first angle of arrival;
weighting the second angle of arrival; and
determining the resultant angle of arrival based on the weighted first angle of arrival and the weighted second angle of arrival.

16. The method of claim 14, further comprising:
at least one of determining or obtaining a first received signal strength indicator associated with the first radio frequency signal and a second received signal strength indicator associated with the second radio frequency signal; and
based on the first received signal strength indicator and the second received signal strength indicator, determine the resultant angle of arrival.

17. The method of claim 14, further comprising:
receiving a first plurality of radio frequency signals from the portable access device via the plurality of antennas;
transmitting a second plurality of radio frequency signals from the vehicle to the portable access device via one or more of the plurality of antennas;
receiving the third radio frequency signal from the portable access device, wherein the third radio frequency signal indicates second angles of arrival of the second plurality of radio frequency signals as received at the portable access device, wherein the first plurality of radio signals include the first radio frequency signal, and wherein the second plurality of radio frequency signals include the second radio frequency signal;
estimating first angles of arrival of the first plurality of radio frequency signals; and
determining the resultant angle of arrival based on the first angles of arrival and the second angles of arrival.

18. The method of claim 17, further comprising:
determining differences between the first angles of arrival and the second angles of arrival;
dropping the differences that are greater than or equal to a predetermined value;
weighting remaining differences; and
determining the resultant angle of arrival based on the weighted differences.

19. The method of claim 17, further comprising:
calculating an angle of arrival for each of a plurality of radio frequencies;
at least one of determining or obtaining a plurality of received signal strength indicators associated with the plurality of radio frequencies; and
determining the resultant angle of arrival based on the angles of arrival for the plurality of radio frequencies and the plurality of received signal strength indicators.

20. The method of claim 14, further comprising:
transmitting a first plurality of radio frequency signals from the portable access device via one or more antennas to the vehicle;
receiving a second plurality of radio frequency signals from the vehicle via the one or more antennas;
estimating second angles of arrival of the second plurality of radio frequency signals; and
transmitting the third radio frequency signal from the portable access device to the vehicle, wherein the third radio frequency signal indicates the second angles of arrival of the second plurality of radio frequency signals as received at the portable access device, wherein the first plurality of radio signals include the first radio frequency signal, and wherein the second plurality of radio frequency signals include the second radio frequency signal.

21. The system of claim 1, wherein the portable access device is a handheld device.

22. The system of claim 1, wherein the portable access device is a key fob, a mobile phone, or a wearable device.

* * * * *